US012628102B2

(12) United States Patent
Li et al.

(10) Patent No.: US 12,628,102 B2
(45) Date of Patent: May 12, 2026

(54) SYNCHRONIZATION ACCURACY FOR REDUCED CAPACITY USER EQUIPMENT IN A NON-TERRESTRIAL NETWORK

(71) Applicant: QUALCOMM Incorporated, San Diego, CA (US)

(72) Inventors: Qiaoyu Li, Beijing (CN); Chao Wei, Beijing (CN); Hao Xu, Beijing (CN); Jing Dai, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/260,695

(22) PCT Filed: Mar. 31, 2021

(86) PCT No.: PCT/CN2021/084329
§ 371 (c)(1),
(2) Date: Jul. 7, 2023

(87) PCT Pub. No.: WO2022/205045
PCT Pub. Date: Oct. 6, 2022

(65) Prior Publication Data
US 2024/0064670 A1 Feb. 22, 2024

(51) Int. Cl.
*H04W 56/00* (2009.01)
*H04W 84/06* (2009.01)

(52) U.S. Cl.
CPC ........ *H04W 56/0015* (2013.01); *H04W 84/06* (2013.01)

(58) Field of Classification Search
CPC ........... H04B 7/18517; H04B 7/18519; H04W 56/001; H04W 56/0015; H04W 84/06; H04J 3/0641

(Continued)

(56) References Cited

U.S. PATENT DOCUMENTS

2018/0213498 A1 7/2018 Khoryaev et al.
2021/0153145 A1* 5/2021 Abedini .............. H04W 72/542
(Continued)

FOREIGN PATENT DOCUMENTS

CN 104735774 A 6/2015
CN 109891959 A 6/2019
CN 112511253 A 3/2021

OTHER PUBLICATIONS

Asia Pacific Telecom: "Discussion on Reference Timing Delivery for NTN", 3GPP Draft, 3GPP TSG RAN WG1#102-e, R1-2006643, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17-Aug. 28, 2020 Aug. 8, 2020 (Aug. 8, 2020), 4 Pages, XP051918166.

(Continued)

*Primary Examiner* — Robert J Lopata

(74) *Attorney, Agent, or Firm* — Harrity & Harrity, LLP

(57) ABSTRACT

Various aspects of the present disclosure generally relate to wireless communication. In some aspects, a user equipment (UE) may determine an uplink and/or downlink synchronization accuracy level that satisfies a reduced capacity synchronization accuracy threshold, wherein the UE comprises a reduced capacity UE and wherein the reduced capacity synchronization accuracy threshold is lower than a synchronization accuracy threshold of an enhanced mobile broadband device. The UE may communicate with a non-terrestrial wireless communication device based at least in part on the synchronization accuracy level. Numerous other aspects are described.

28 Claims, 8 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 2021/0385766 A1* | 12/2021 | Manolakos | ....... | H04W 52/0216 |
| 2023/0134036 A1* | 5/2023 | Larsson | ............ | H04W 56/0055 |
| | | | | 370/350 |
| 2023/0180157 A1* | 6/2023 | Chandramouli | .... | H04W 56/001 |
| | | | | 370/350 |
| 2023/0413226 A1* | 12/2023 | Manolakos | ......... | H04W 64/006 |

OTHER PUBLICATIONS

Huawei, et al., "Discussion on Latency and Time Synchronization Accuracy in Rel-16", 3GPP Draft, 3GPP TSG RAN WG1 Meeting #95, Spokane, USA, Nov. 12-16, 2018, 12 Pages.
International Search Report and Written Opinion—PCT/CN2021/084329—ISA/EPO—Dec. 30, 2021.
Nokia, et al., "UE Complexity Reduction Features", 3GPP Draft, 3GPP TSG RAN WG1 Meeting #102-e, R1-2005525, 3rd Generation Partnership Project, Mobile Competence Centre, 650, Route Des Lucioles, F-06921 Sophia-Antipolis Cedex, France, vol. RAN WG1, No. e-Meeting, Aug. 17-Aug. 28, 2020, Aug. 7, 2020, XP051914963, 17 pages, sections 1-4, tables 1-12.
Supplementary European Search Report—EP21933722—Search Authority—The Hague—Dec. 13, 2024.

* cited by examiner

420
Determine RedCap synchronization accuracy level

UE
120

425
Communicate based at least in part on the RedCap synchronization accuracy level 410
Request for lowered synchronization accuracy level 415
Indication that indicates reduced capacity synchronization accuracy level Wireless Communication Device
405

400

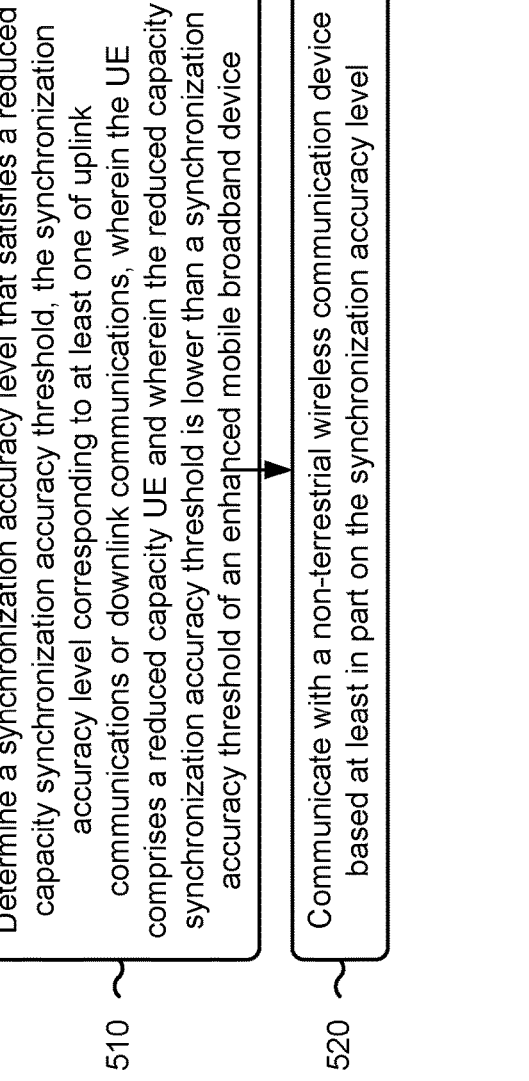

500

510

Determine a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device

520

Communicate with a non-terrestrial wireless communication device based at least in part on the synchronization accuracy level

FIG. 5

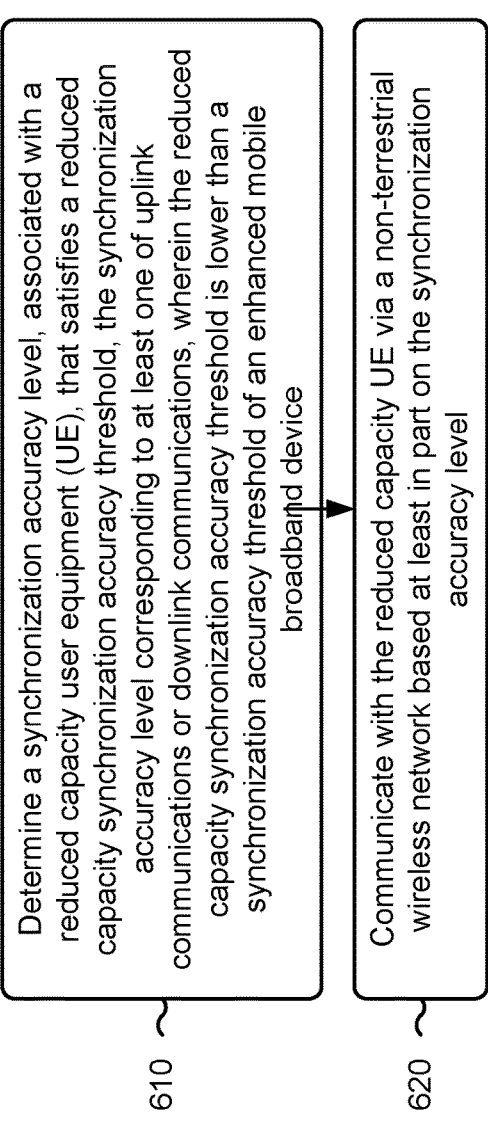

Determine a synchronization accuracy level, associated with a reduced capacity user equipment (UE), that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device Communicate with the reduced capacity UE via a non-terrestrial wireless network based at least in part on the synchronization accuracy level

610

620

600

SYNCHRONIZATION ACCURACY FOR REDUCED CAPACITY USER EQUIPMENT IN A NON-TERRESTRIAL NETWORK

CROSS-REFERENCE TO RELATED APPLICATION

This Patent Application is a 371 national stage of PCT Application No. PCT/CN2021/084329 filed on Mar. 31, 2021, entitled "SYNCHRONIZATION ACCURACY FOR REDUCED CAPACITY USER EQUIPMENT IN A NON-TERRESTRIAL NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for synchronization accuracy for a reduced capacity user equipment in a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) B S, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIND) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors, coupled to the memory, configured to: determine a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device; and communicate with a non-terrestrial wireless communication device based at least in part on the synchronization accuracy level.

In some aspects, a non-terrestrial wireless communication device for wireless communication includes a memory; and one or more processors, coupled to the memory, configured to: determine a synchronization accuracy level, associated with a reduced capacity UE, that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device; and communicate with the reduced capacity UE via a non-terrestrial wireless network based at least in part on the synchronization accuracy level.

In some aspects, a method of wireless communication performed by a UE includes determining a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device; and communicating with a non-terrestrial wireless communication device based at least in part on the synchronization accuracy level.

In some aspects, a method of wireless communication performed by a non-terrestrial wireless communication device includes determining a synchronization accuracy level, associated with a reduced capacity UE, that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device; and communicating with the reduced capacity UE via a non-terrestrial wireless network based at least in part on the synchronization accuracy level.

In some aspects, a non-transitory computer-readable medium stores a set of instructions for wireless communication includes one or more instructions that, when executed by one or more processors of a UE, cause the UE to: determine a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device; and communicate with a non-terrestrial wireless communication device based at least in part on the synchronization accuracy level.

In some aspects, a non-transitory computer-readable medium stores a set of instructions for wireless communication includes one or more instructions that, when executed by one or more processors of a non-terrestrial wireless communication device, cause the non-terrestrial wireless communication device to: determine a synchronization accuracy level, associated with a reduced capacity UE, that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device; and communicate with the reduced capacity UE via a non-terrestrial wireless network based at least in part on the synchronization accuracy level.

In some aspects, an apparatus for wireless communication includes means for determining a synchronization accuracy level that satisfies a reduced capacity synchronization accuracy threshold, the synchronization accuracy level corresponding to at least one of uplink communications or downlink communications, wherein the apparatus comprises a reduced capacity user equipment and wherein the reduced capacity synchronization accuracy threshold is lower than a synchronization accuracy threshold of an enhanced mobile broadband device; and means for communicating with a non-terrestrial wireless communication device based at least in part on the synchronization accuracy level.

In some aspects, an apparatus for wireless communication includes means for determining a synchronization accuracy level, associated with a reduced capacity UE, that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device; and means for communicating with the reduced capacity UE via a non-terrestrial wireless network based at least in part on the synchronization accuracy level.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5 and 6 are diagrams illustrating example processes associated with synchronization accuracy for RedCap UE in an NTN, in accordance with the present disclosure.

DETAILED DESCRIPTION

Figure 1:
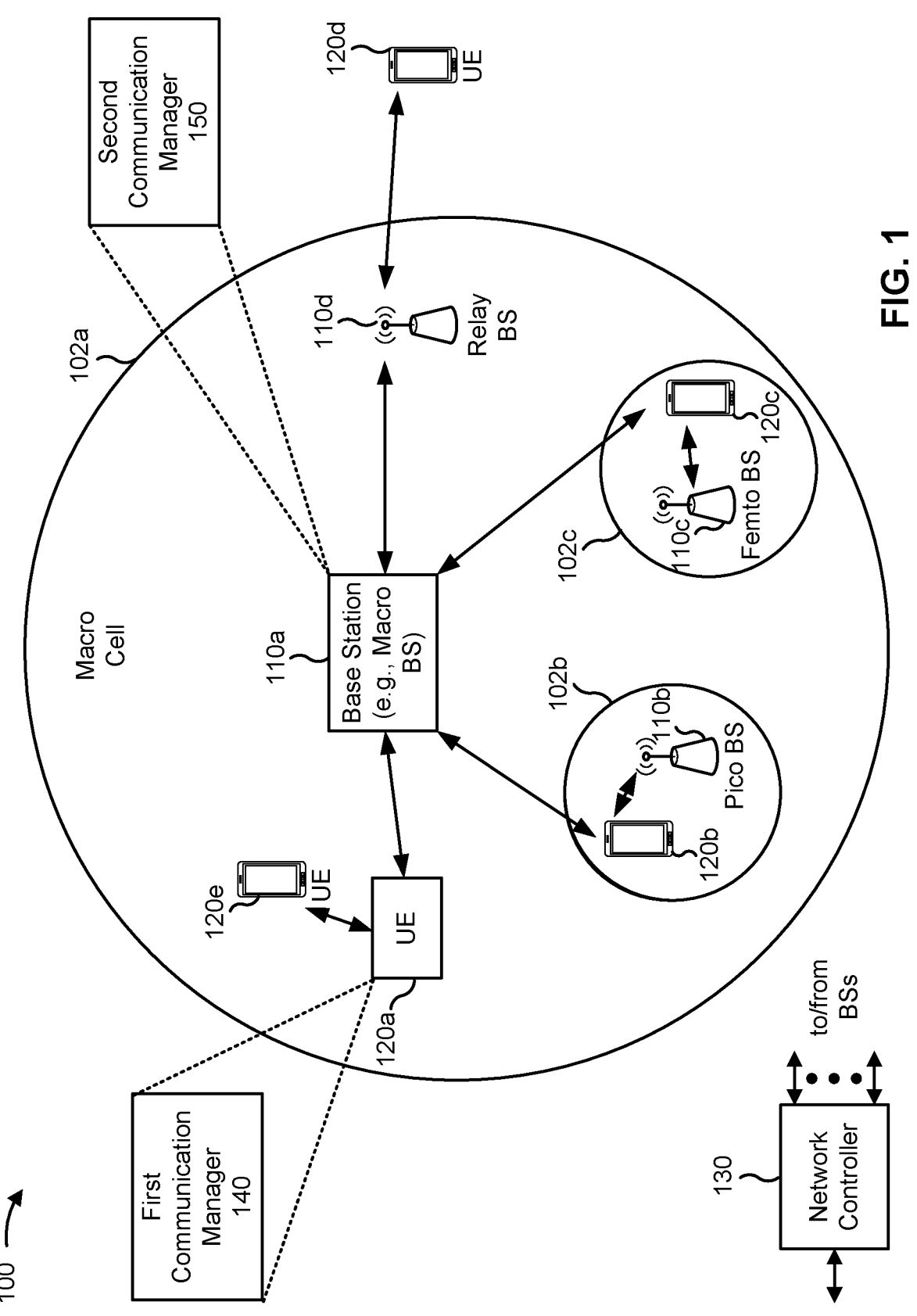
FIG. 1 is a diagram illustrating an example of a wireless network, in accordance with the present disclosure.

In non-terrestrial network (NTN) implementations, a UE may experience large propagation delays with respect to a cell and/or a satellite associated with the cell due to large differences in velocity between the UE and the satellite. To facilitate timing and frequency synchronization, an enhanced mobile broadband (eMBB) UE may acquire global navigation satellite system (GNSS) positioning information and/or restore or calculate satellite ephemeris, which may consume large amounts of power, memory, and/or computational resources.

In some aspects, an NTN implementation may serve different UEs of different categories and/or different UEs that support different capabilities. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capacity (RedCap) UE (which may be interchangeably referred to as a reduced capability UE, also having the acronym "RedCap"), a low tier UE, and/or an NR-Lite UE, among other examples. A UE of the second category may be an ultra-reliable low-latency communication (URLLC) devices and/or an enhanced mobile broadband (eMBB) device and may have an advanced feature set compared to RedCap UEs. RedCap UEs may include wearable devices, Internet of Things (IoT) devices, sensors, cameras, and/or the like that are associated with a limited bandwidth, power capacity, and/or transmission range, among other examples. A UE of the second category may be referred to as a baseline UE, a high tier UE, an NR UE, and/or a premium UE, among other examples. In some aspects, a RedCap UE may have capabilities that satisfy requirements of a first wireless communication standard but not a second wireless communication standard, while a UE of the second category may have capabilities that satisfy requirements of the second wireless communication standard (and also the first wireless communication standard, in some cases).

For example, a RedCap UE of the first category may support a lower maximum modulation and coding scheme (MCS) than a UE of the second category (e.g., quadrature phase shift keying (QPSK) or the like as compared to 256-quadrature amplitude modulation (QAM) or the like), may support a lower maximum transmit power than a UE of the second category, may have a less advanced beamforming capability than a UE of the second category (e.g., may not be capable of forming as many beams as a UE of the second category), may require a longer processing time than a UE of the second category, may include less hardware than a UE of the second category (e.g., fewer antennas, fewer transmit antennas, and/or fewer receive antennas), and/or may not be capable of communicating on as wide of a maximum bandwidth part as a UE of the second category, among other examples.

RedCap UEs may not have sufficient power, memory, and/or computational resources available for the processes for facilitating timing and frequency synchronization with a satellite associated with an NTN at all times. In some instances, the bandwidth, power capacity, computational capability, and/or transmission range of a RedCap UE may be limited or reduced relative to an eMBB UE (which may be referred to herein, interchangeably, as a "non-RedCap eMMB UE").

Aspects of techniques and apparatuses described herein facilitate providing for synchronization accuracy tolerances that are lower for RedCap UEs than for non-RedCap eMBB devices when performing synchronization processes with an NTN. In some aspects, a RedCap UE may determine a synchronization accuracy level that satisfies a reduced capacity synchronization accuracy threshold, and may communicate with a non-terrestrial wireless communication device based at least in part on the synchronization accuracy level. As a result, aspects may facilitate enabling RedCap UEs to perform synchronization processes with respect to an NTN using lower synchronization accuracies than a non-RedCap eMBB device uses, thereby reducing the amount of power, memory, and/or computational resources consumed by the RedCap UE during synchronization, improving the performance of NTN communications and having a positive impact on NTN performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may determine a synchronization accuracy level that satisfies a reduced capacity synchronization accuracy threshold, wherein the UE comprises a reduced capacity (RedCap) UE and wherein the reduced capacity synchronization accuracy threshold is lower than a synchronization accuracy threshold of an enhanced mobile broadband device; and communicate with a non-terrestrial wireless communication device based at least in part on the synchronization accuracy level. Additionally, or alternatively, the first communication manager 140 may perform one or more other operations described herein.

As shown in FIG. 1, the base station 110 may include a second communication manager 150. As described in more detail elsewhere herein, the second communication manager 150 may determine a synchronization accuracy level, associated with a RedCap UE, that satisfies a reduced capacity synchronization accuracy threshold, wherein the reduced capacity synchronization accuracy threshold is lower than a synchronization accuracy threshold of an enhanced mobile broadband device; and communicate with the RedCap UE via a non-terrestrial wireless network based at least in part on the synchronization accuracy level. Additionally, or alternatively, the second communication manager 150 may perform one or more other operations described herein.

Additionally, or alternatively, the second communication manager 150 may perform one or more other operations described herein.

As indicated above, FIG. 1 is provided as an example. Other examples may differ from what is described with regard to FIG. 1.

Figure 2:
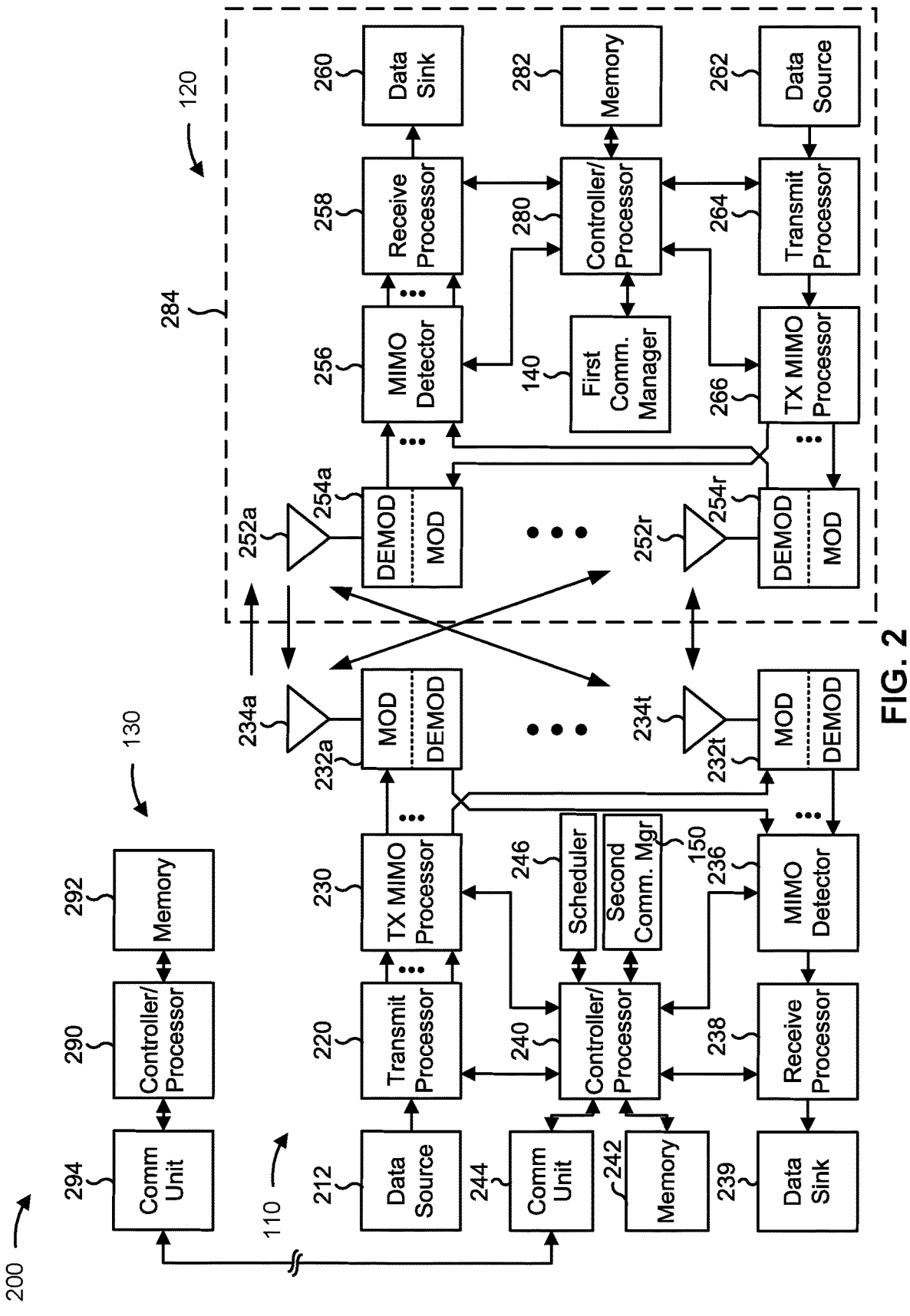
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODS) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor

240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with synchronization accuracy for a RedCap UE in an NTN, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for determining a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of a non-RedCap enhanced mobile broadband device; and/or means for communicating with a non-terrestrial wireless communication device based at least in part on the synchronization accuracy level. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the non-terrestrial wireless communication device includes means for determining a synchronization accuracy level, associated with a reduced capacity UE, that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device; and/or means for communicating with the reduced capacity UE via a non-terrestrial wireless network based at least in part on the synchronization accuracy level. In some aspects, the means for the non-terrestrial wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the non-terrestrial wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
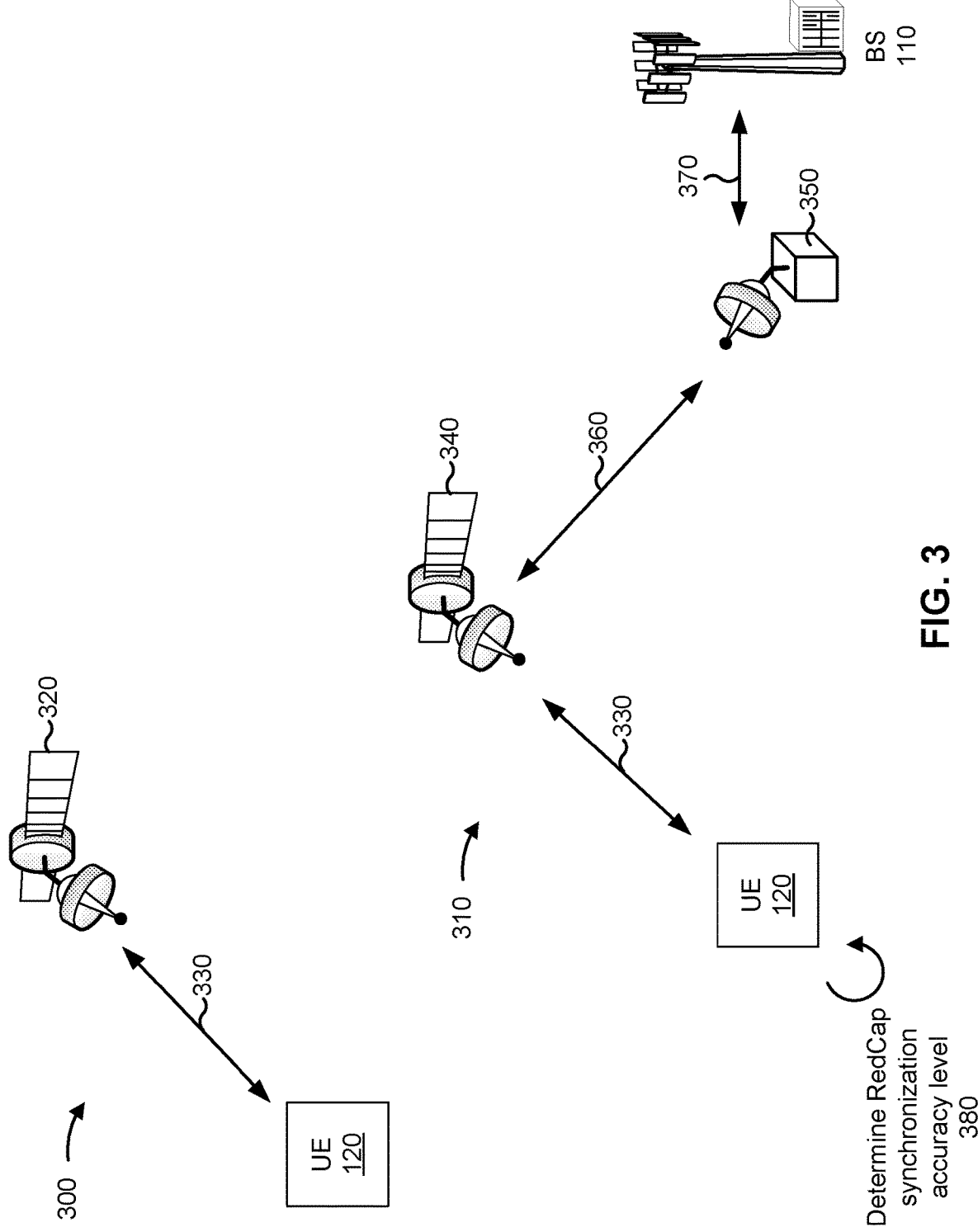
FIG. 3 is a diagram illustrating examples of non-terrestrial network (NTN) deployments, in accordance with the present disclosure.

FIG. 3 is a diagram illustrating examples 300 and 310 of NTN deployments. The example 300 and/or the example 310 may be, be similar to, include, or be included in, a wireless network such as the wireless network 100 shown in, and described in connection with, FIG. 1.

Example 300 shows a regenerative satellite deployment. In example 300, a UE 120 is served by a satellite 320 via a service link 330. For example, the satellite 320 may include a BS 110 (e.g., BS 110a), a gNB, one or more functions (e.g., RF filtering, frequency conversion, amplification, demodulation, decoding, switching, routing, coding, modulation, and/or the like) of a BS 110, and/or the like. The service link 330 may include an NR-Uu interface that is terminated at the satellite 320. In some aspects, the satellite 320 may be referred to as a non-terrestrial base station, a regenerative repeater, an on-board processing repeater, and/or the like. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be referred to as a transparent satellite, a bent-pipe satellite, a non-terrestrial relay station, and/or the like. The satellite 340 may relay a signal received from a terrestrial BS 110, via an NTN gateway 350. The satellite may repeat an NR-Uu interface via a feeder link 360. The NTN gateway 350 may communicatively connect the satellite 340 and the BS 110 using an RF link 370. For example, the satellite 340 may receive an uplink radio frequency transmission, and may transmit a downlink radio frequency transmission without demodulating the uplink radio frequency transmission. In some aspects, the satellite 340 may frequency convert the uplink radio frequency transmission received on the service link 330 to a frequency of the downlink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide and/or facilitate a cell that covers the UE 120.

The service link 330 may include a link between the satellite 340 and the UE 120, and may include one or more of an uplink or a downlink. The feeder link 360 may include a link between the satellite 340 and the gateway 350, and may include one or more parts of an uplink (e.g., from the UE 120 to the gateway 350) or a downlink (e.g., from the gateway 350 to the UE 120).

In NTN implementations, the UE 120 may experience large propagation delays with respect to a cell and/or a satellite associated with the cell due to large differences in velocity between the UE 120 and the satellites 320 and/or 340. To facilitate timing and frequency synchronization, an enhanced mobile broadband (eMBB) UE 120 may acquire global navigation satellite system (GNSS) positioning information and/or restore or calculate satellite ephemeris. GNSS processes and satellite ephemeris determination processes may consume large amounts of power, memory, and/or computational resources. Reduced capacity (RedCap) UEs may not have sufficient power, memory, and/or computational resources available for these processes at all times. As a result, timing and frequency synchronization for uplink and downlink communications used by eMBB devices may not be effective for facilitating reliable communications with RedCap devices, and the use thereof may have a negative impact on network performance.

Aspects of techniques and apparatuses described herein facilitate providing for uplink and/or downlink synchronization accuracy tolerances that are lower for RedCap UEs than for eMBB devices when performing synchronization processes with an NTN. In some aspects, as shown by reference number 380 in FIG. 3, a RedCap UE 120 may determine a synchronization accuracy level that satisfies a reduced capacity synchronization accuracy threshold (shown as a "RedCap synchronization accuracy level"). The reduced capacity synchronization accuracy threshold may be lower than a synchronization accuracy threshold of an eMBB device. The UE may communicate with a non-terrestrial wireless communication device based at least in part on the synchronization accuracy level. As a result, aspects may facilitate enabling RedCap UEs to perform synchronization processes with respect to an NTN using lower synchronization accuracies than an eMBB device uses, thereby reducing the amount of power, memory, and/or computational resources consumed by the RedCap UE during synchronization, improving the performance of NTN communications.

As indicated above, FIG. 3 is provided as an example. Other examples may differ from what is described with regard to FIG. 3.

Figure 4:
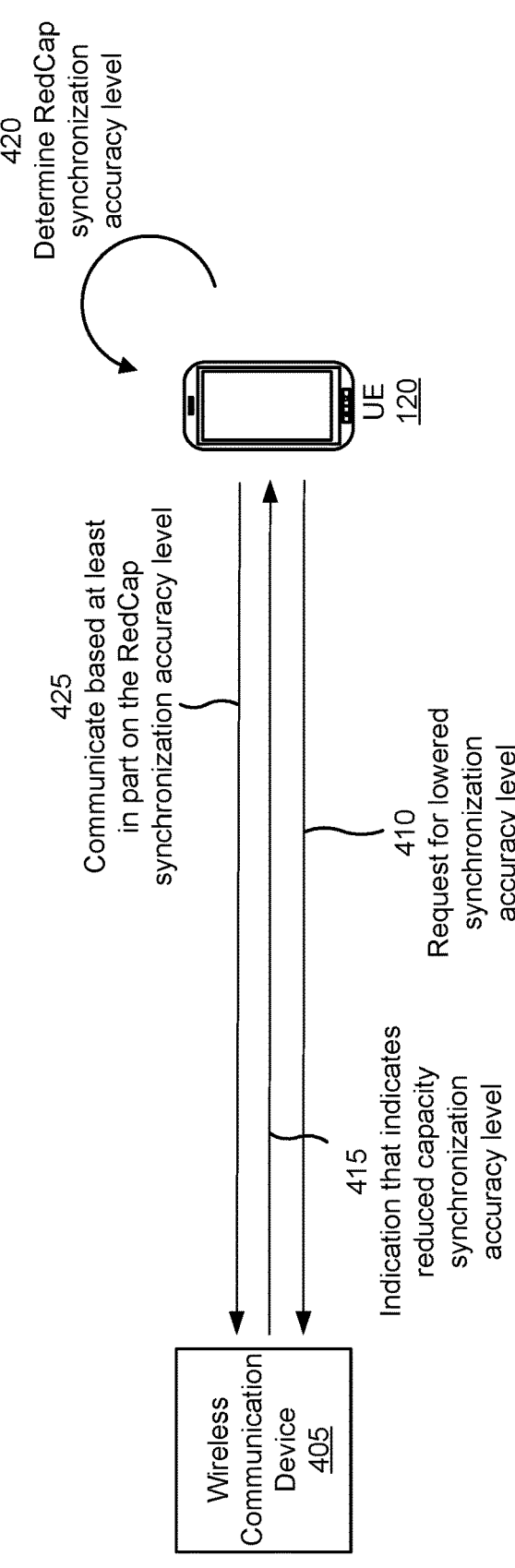
FIG. 4 is a diagram illustrating an example associated with synchronization accuracy for reduced capacity (Red-Cap) user equipment (UE) in an NTN, in accordance with the present disclosure.

FIG. 4 is a diagram illustrating an example 400 associated with a RedCap UE in an NTN, in accordance with the present disclosure. As shown, a non-terrestrial wireless communication device 405 and a UE 120 may communicate with one another. The non-terrestrial wireless communication device 405 may include a base station (e.g., BS 110 shown in, and described in connection with, FIG. 1, and/or the like), a non-terrestrial base station (e.g., the satellite 320 shown in, and described in connection with, FIG. 3), a non-terrestrial relay station (e.g., the satellite 340 shown in, and described in connection with, FIG. 3), and/or the like.

As shown by reference number 410, the UE 120 may transmit, and the non-terrestrial wireless communication device 405 may receive, a request for a lowered synchronization accuracy level. The synchronization accuracy level may correspond to uplink communications and/or downlink communications. In some aspects, the UE 120 may transmit the request based at least in part on transmitting at least one of an uplink radio resource control (RRC) message, an uplink medium access control control element (MAC CE), or an uplink control information transmission. In some aspects, the request may indicate a suggested synchronization accuracy level.

As shown by reference number 415, the non-terrestrial wireless communication device 405 may transmit, and the UE 120 may receive, an indication that indicates a reduced capacity synchronization accuracy level. In some aspects, the indication may be carried using a system information broadcast message, a downlink RRC message, a downlink MAC CE, and/or a downlink control information (DCI) transmission.

As shown by reference number 420, the UE 120 may determine a reduced capacity synchronization accuracy level. The reduced capacity synchronization accuracy level may include a synchronization accuracy level that satisfies a reduced capacity synchronization accuracy threshold. The reduced capacity synchronization accuracy threshold may be lower than a synchronization accuracy threshold of an eMBB device.

In some aspects, the UE 120 may determine the synchronization accuracy level based at least in part on the indication received from the non-terrestrial wireless communication device 405. In some aspects, the UE 120 may determine the synchronization accuracy level without receiving the indication and/or otherwise independently from receiving the indication. For example, in some aspects, the UE 120 may not transmit the request for the lowered synchronization accuracy level and/or may not receive an indication of the lowered synchronization accuracy level from the non-terrestrial wireless communication device 405. In some aspects, for example, determining the synchronization accuracy level comprises determining the synchronization accuracy level based at least in part on at least one of a global navigation satellite system positioning accuracy or a serving satellite ephemeris.

As shown by reference number 425, the UE 120 may communicate with a non-terrestrial wireless communication device 405 based at least in part on the synchronization accuracy level. In some aspects, communicating with the non-terrestrial wireless communication device based at least in part on the synchronization accuracy level may include at least one of disabling a GNSS positioning process, disabling a satellite ephemeris determination process, lowering a GNSS positioning procedure accuracy level, or lowering a satellite ephemeris determination procedure accuracy level.

In some aspects, the UE 120 may communicate with the wireless communication device using a reduced capacity numerology and/or resource allocation. For example, the UE 120 may determine at least one of a reduced capacity numerology or a reduced capacity resource allocation associated with at least one of a physical uplink shared channel (PUSCH), a physical uplink control channel (PUCCH), a random access channel (RACH) preamble transmission, a physical downlink shared channel (PSCH), a physical downlink control channel (PDCCH), a reference signal associated with a physical uplink channel, a reference signal associated with a physical downlink channel, a synchronization signal, a channel state information reference signal, and/or a positioning reference signal, among other examples. In some aspects, the reduced capacity numerology may include a subcarrier spacing (SCS) that is greater than an SCS associated with an eMBB device, a cyclic prefix (CP) that is longer than a CP associated with the eMBB device, and/or a symbol duration that is longer than a symbol duration associated with the eMBB device.

In some aspects, the UE 120 may determine the reduced accuracy resource allocation by receiving an indication of the reduced capacity resource allocation, wherein the indication of the reduced capacity resource allocation indicates a number of available tones for transmission that is less than a number of available tones for transmission associated with an eMBB device. In some aspects, the number of available tones corresponds to a first subset of resource elements (REs) of a set of REs within a scheduled resource, wherein the set of REs comprises the first subset of REs and a second subset of REs, and wherein the second subset of REs are to be unused by the UE 120.

In some aspects, the UE 120 may determine the at least one of the reduced capacity numerology or the reduced capacity resource allocation by determining the at least one of the reduced capacity numerology or the reduced capacity resource allocation based at least in part on a dedicated bandwidth part. In some aspects, the UE 120 may determine the at least one of the reduced capacity numerology or the reduced capacity resource allocation by determining the at least one of the reduced capacity numerology or the reduced capacity resource allocation based at least in part on at least one of referencing a wireless communication standard or receiving the indication from the non-terrestrial wireless communication device 405.

As indicated above, FIG. 4 is provided as an example. Other examples may differ from what is described with regard to FIG. 4.

FIG. 5 is a diagram illustrating an example process 500 performed, for example, by a UE, in accordance with the present disclosure. Example process 500 is an example where the UE (e.g., UE 120) performs operations associated with synchronization accuracy for a RedCap UE in an NTN.

As shown in FIG. 5, in some aspects, process 500 may include determining a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device (block 510). For example, the UE (e.g., using determination component 710, depicted in FIG. 7) may determine a synchronization accuracy level that satisfies a reduced capacity synchronization accuracy threshold, the synchronization accuracy level corresponding to at least one of uplink communications or downlink communications, wherein the UE comprises a RedCap UE and wherein the reduced capacity synchronization accuracy threshold is lower than a synchronization accuracy threshold of an enhanced mobile broadband device, as described above.

As further shown in FIG. 5, in some aspects, process 500 may include communicating with a non-terrestrial wireless communication device based at least in part on the synchronization accuracy level (block 520). For example, the UE (e.g., using reception component and/or transmission component 704, depicted in FIG. 4) may communicate with a non-terrestrial wireless communication device based at least in part on the synchronization accuracy level, as described above.

Process 500 may include additional aspects, such as any single aspect or any combination of aspects described below and/or in connection with one or more other processes described elsewhere herein.

In a first aspect, determining the synchronization accuracy level comprises determining the synchronization accuracy level based at least in part on at least one of a global navigation satellite system positioning accuracy or a serving satellite ephemeris.

In a second aspect, alone or in combination with the first aspect, communicating with the non-terrestrial wireless communication device based at least in part on the synchronization accuracy level comprises at least one of disabling a GNSS positioning process, disabling a satellite ephemeris determination process, lowering a GNSS positioning procedure accuracy level, or lowering a satellite ephemeris determination procedure accuracy level.

In a third aspect, alone or in combination with one or more of the first and second aspects, determining the synchronization accuracy level comprises determining the synchronization accuracy level based at least in part on at least one of referencing a wireless communication standard, or receiving, from a serving non-terrestrial wireless device, an indication that indicates the synchronization accuracy level, wherein determining the synchronization accuracy level comprises determining the synchronization accuracy level based at least in part on the indication.

In a fourth aspect, alone or in combination with one or more of the first through third aspects, receiving the indication comprises receiving at least one of a system information broadcast message, a downlink RRC message, a downlink MAC CE, or a DCI transmission.

In a fifth aspect, alone or in combination with one or more of the first through fourth aspects, process 500 includes transmitting a request for a lowered synchronization accuracy level, wherein receiving the indication comprises receiving the indication based at least in part on transmitting the request.

In a sixth aspect, alone or in combination with one or more of the first through fifth aspects, transmitting the request comprises transmitting at least one of an uplink RRC message, an uplink MAC CE, or an uplink control information transmission.

In a seventh aspect, alone or in combination with one or more of the first through sixth aspects, the request indicates a suggested synchronization accuracy level.

In an eighth aspect, alone or in combination with one or more of the first through seventh aspects, process 500 includes determining at least one of a reduced capacity numerology or a reduced capacity resource allocation associated with at least one of a physical uplink shared channel, a physical uplink control channel, a random access channel preamble transmission, a physical downlink shared channel, a physical downlink control channel, a reference signal associated with a physical uplink channel, a reference signal associated with a physical downlink channel, a synchronization signal, a channel state information reference signal, or a positioning reference signal.

In a ninth aspect, alone or in combination with one or more of the first through eighth aspects, the reduced capacity numerology comprises at least one of a subcarrier spacing that is greater than a subcarrier spacing associated with an eMBB device, a cyclic prefix that is longer than a cyclic prefix associated with the eMBB device, or a symbol duration that is longer than a symbol duration associated with the eMBB device.

In a tenth aspect, alone or in combination with one or more of the first through ninth aspects, determining the reduced capacity resource allocation comprises receiving an indication of the reduced capacity resource allocation, wherein the indication of the reduced capacity resource allocation indicates a number of available tones for transmission that is less than a number of available tones for transmission associated with an eMBB device.

In an eleventh aspect, alone or in combination with one or more of the first through tenth aspects, the number of available tones corresponds to a first subset of REs of a set of REs within a scheduled resource, wherein the set of REs comprises the first subset of REs and a second subset of REs, and wherein the second subset of REs are to be unused by the UE.

In a twelfth aspect, alone or in combination with one or more of the first through eleventh aspects, determining the at least one of the reduced capacity numerology or the reduced capacity resource allocation comprises determining the at least one of the reduced capacity numerology or the reduced capacity resource allocation based at least in part on a dedicated bandwidth part.

In a thirteenth aspect, alone or in combination with one or more of the first through twelfth aspects, determining the at least one of the reduced capacity numerology or the reduced capacity resource allocation comprises determining the at least one of the reduced capacity numerology or the reduced capacity resource allocation based at least in part on at least one of referencing a wireless communication standard, or receiving, from a serving non-terrestrial wireless device, an indication that indicates the synchronization accuracy level, wherein determining the synchronization accuracy level comprises determining the synchronization accuracy level based at least in part on the indication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a non-terrestrial wireless communication device, in accordance with the present disclosure. Example process 600 is an example where the non-terrestrial wireless communication device (e.g., wireless communication device 405) performs operations associated with synchronization accuracy for a RedCap UE in an NTN.

As shown in FIG. 6, in some aspects, process 600 may include determining a synchronization accuracy level, associated with a RedCap UE, that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device (block 610). For example, the non-terrestrial wireless communication device (e.g., using determination component 810, depicted in FIG. 8) may determine a synchronization accuracy level, associated with RedCap UE, that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device, as described above.

As further shown in FIG. 6, in some aspects, process 600 may include communicating with the reduced capacity UE via a non-terrestrial wireless network based at least in part on the synchronization accuracy level (block 620). For example, the non-terrestrial wireless communication device (e.g., using reception component 802 and/or transmission component 804, depicted in FIG. 8) may communicate with the reduced capacity UE via a non-terrestrial wireless network based at least in part on the synchronization accuracy level, as described above.

Process 600 may include additional aspects, such as any single aspect or any combination of aspects described below and/or in connection with one or more other processes described elsewhere herein.

In a first aspect, determining the synchronization accuracy level comprises determining the synchronization accuracy level based at least in part on at least one of a global navigation satellite system positioning accuracy or a serving satellite ephemeris.

In a second aspect, alone or in combination with the first aspect, communicating with the UE based at least in part on the synchronization accuracy level comprises communicating with the UE based at least in part on at least one of a disabled GNSS positioning process, a disabled satellite ephemeris determination process, a lowered GNSS positioning procedure accuracy level, or a lowered satellite ephemeris determination procedure accuracy level.

In a third aspect, alone or in combination with one or more of the first and second aspects, determining the synchronization accuracy level comprises determining the synchronization accuracy level based at least in part on at least one of referencing a wireless communication standard, or transmitting, to the UE, an indication that indicates the synchronization accuracy level, wherein determining the synchronization accuracy level comprises determining the synchronization accuracy level based at least in part on the indication.

In a fourth aspect, alone or in combination with one or more of the first through third aspects, transmitting the indication comprises transmitting at least one of a system information broadcast message, a downlink RRC message, a downlink MAC CE, or a DCI transmission.

In a fifth aspect, alone or in combination with one or more of the first through fourth aspects, process 600 includes receiving a request for a lowered synchronization accuracy level, wherein transmitting the indication comprises transmitting the indication based at least in part on receiving the request.

In a sixth aspect, alone or in combination with one or more of the first through fifth aspects, receiving the request comprises receiving at least one of an uplink RRC message, an uplink MAC CE, or an uplink control information transmission.

In a seventh aspect, alone or in combination with one or more of the first through sixth aspects, the request indicates a suggested synchronization accuracy level.

In an eighth aspect, alone or in combination with one or more of the first through seventh aspects, process 600 includes determining at least one of a reduced capacity numerology or a reduced capacity resource allocation associated with at least one of a physical uplink shared channel, a physical uplink control channel, a random access channel preamble transmission, a physical downlink shared channel, a physical downlink control channel, a reference signal associated with a physical uplink channel, a reference signal associated with a physical downlink channel, a synchronization signal, a channel state information reference signal, or a positioning reference signal.

In a ninth aspect, alone or in combination with one or more of the first through eighth aspects, the reduced capacity numerology comprises at least one of a subcarrier spacing that is greater than a subcarrier spacing associated with an eMBB device, a cyclic prefix that is longer than a cyclic prefix associated with the eMBB device, or a symbol duration that is longer than a symbol duration associated with the eMBB device.

In a tenth aspect, alone or in combination with one or more of the first through ninth aspects, determining the reduced capacity resource allocation comprises transmitting an indication of the reduced capacity resource allocation, wherein the indication of the reduced capacity resource allocation indicates a number of available tones for transmission that is less than a number of available tones for transmission associated with an eMBB device.

In an eleventh aspect, alone or in combination with one or more of the first through tenth aspects, the number of available tones corresponds to a first subset of REs of a set of REs within a scheduled resource, wherein the set of REs comprises the first subset of REs and a second subset of REs, and wherein the second subset of REs are to be unused by the reduced capacity UE.

In a twelfth aspect, alone or in combination with one or more of the first through eleventh aspects, determining the at least one of the reduced capacity numerology or the reduced capacity resource allocation comprises determining the at least one of the reduced capacity numerology or the reduced capacity resource allocation based at least in part on a dedicated bandwidth part.

In a thirteenth aspect, alone or in combination with one or more of the first through twelfth aspects, determining the at least one of the reduced capacity numerology or the reduced capacity resource allocation comprises determining the at least one of the reduced capacity numerology or the reduced capacity resource allocation based at least in part on at least one of referencing a wireless communication standard, or transmitting, to the UE, an indication that indicates the synchronization accuracy level, wherein determining the synchronization accuracy level comprises determining the synchronization accuracy based at least in part on the indication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
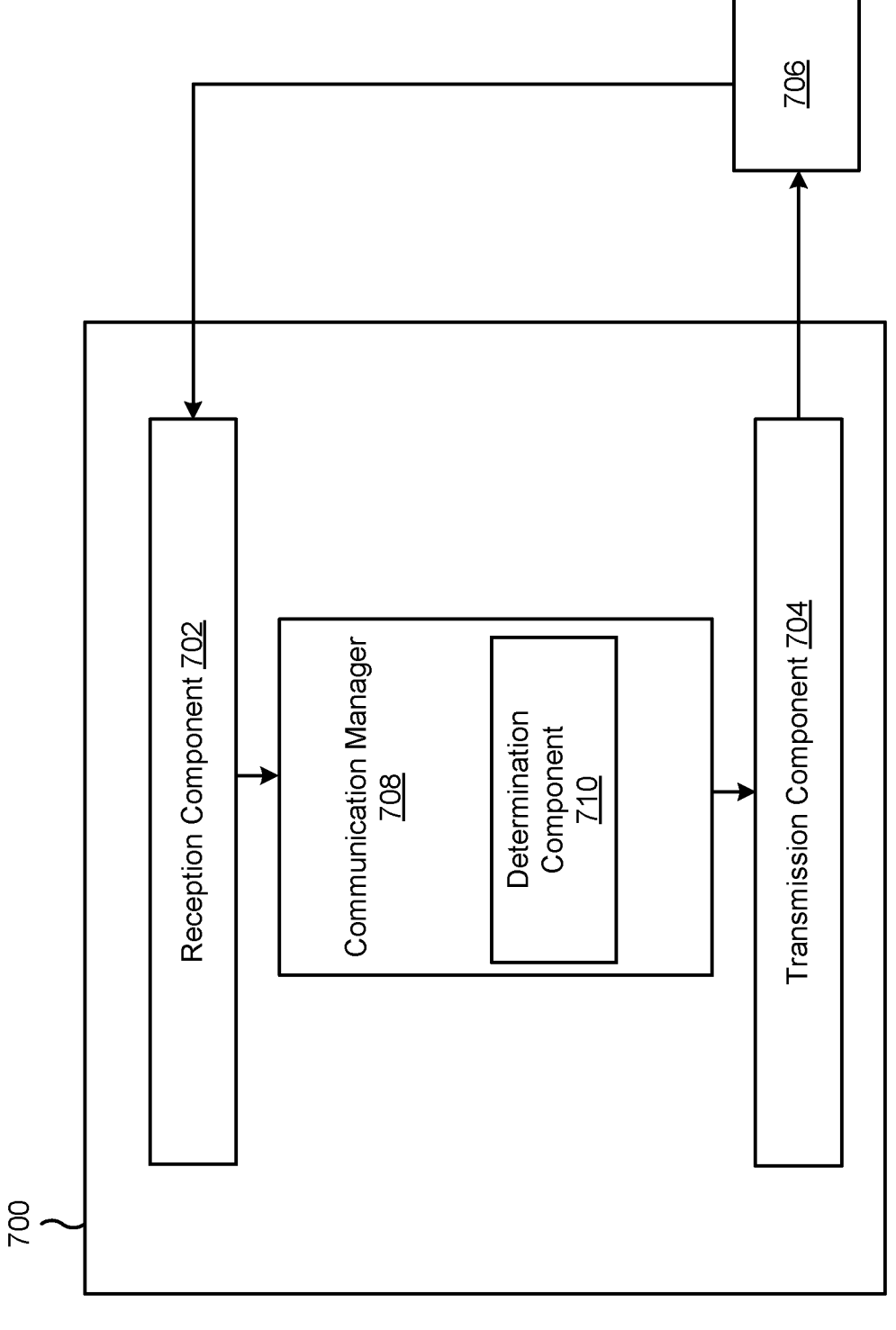
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708. The communication manager may include a determination component 710.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 708 may manage communications associated with the apparatus 700. For example, the communication manager may coordinate operations of the reception component 702 and/or the transmission component 704. The communication manager 708 may include the determination component 710. In some aspects, the communication manager 708 may include one or more antennas, a modulator, a transmit MIMO processor, a transmit processor, a controller/processor, a memory, or a combination thereof, of the UE described above in connection with FIG. 2. In some aspects, the communication manager 708 may include the reception component 702 and/or the transmission component 704.

The determination component 710 may determine a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device. In some aspects, the determination component 710 may include one or more antennas, a modulator, a transmit MIMO processor, a transmit processor, a controller/processor, a memory, or a combination thereof, of the UE described above in connection with FIG. 2. In some aspects, the determination component 710 may include the reception component 702 and/or the transmission component 704.

The reception component 702 and/or the transmission component 704 may communicate with a non-terrestrial wireless communication device based at least in part on the synchronization accuracy level. The transmission component 704 may transmit a request for a lowered synchronization accuracy level, wherein receiving the indication comprises receiving the indication based at least in part on transmitting the request.

The determination component 710 may determine at least one of a reduced capacity numerology or a reduced capacity resource allocation associated with at least one of a physical uplink shared channel, a physical uplink control channel, a random access channel preamble transmission, a physical downlink shared channel, a physical downlink control channel, a reference signal associated with a physical uplink channel, a reference signal associated with a physical downlink channel, a synchronization signal, a channel state information reference signal, or a positioning reference signal.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
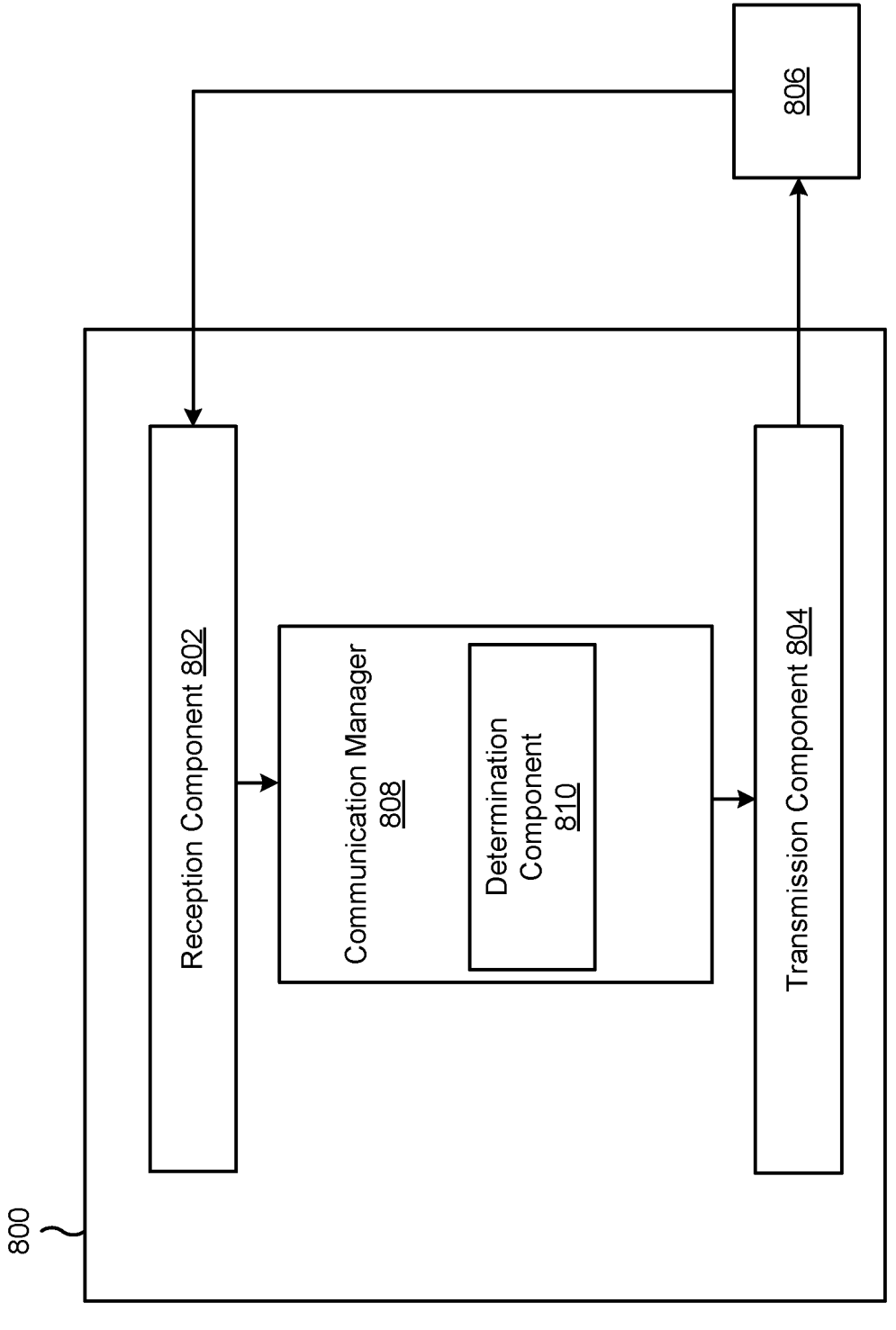

FIG. 8 is a block diagram of an example apparatus 800 for wireless communication. The apparatus 800 may be a non-terrestrial wireless communication device, or a non-terrestrial wireless communication device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808. The communication manager 808 may include a determination component 810.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the non-terrestrial wireless communication device described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The communication manager 808 may manage communications associated with the apparatus 800. For example, the communication manager may coordinate operations of the reception component 802 and/or the transmission component 804. The communication manager 808 may include the determination component 810. In some aspects, the communication manager 808 may include one or more antennas, a modulator, a transmit MIMO processor, a transmit processor, a controller/processor, a memory, or a combination thereof, of the base station described above in connection with FIG. 2. In some aspects, the communication manager 808 may include the reception component 802 and/or the transmission component 804.

The determination component 810 may determine a synchronization accuracy level, associated with a RedCap UE, that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device. In some aspects, the determination component 810 may include one or more antennas, a modulator, a transmit MIMO processor, a transmit processor, a controller/processor, a memory, or a combination thereof, of the base station described above in connection with FIG. 2. In some aspects, the determination component 810 may include the reception component 802 and/or the transmission component 804.

The reception component 802 and/or the transmission component 804 may communicate with the RedCap UE via a non-terrestrial wireless network based at least in part on the synchronization accuracy level. The reception component 802 may receive a request for a lowered synchronization accuracy level, wherein transmitting the indication comprises transmitting the indication based at least in part on receiving the request.

The determination component 810 may determine at least one of a reduced capacity numerology or a reduced capacity resource allocation associated with at least one of a physical uplink shared channel, a physical uplink control channel, a random access channel preamble transmission, a physical downlink shared channel, a physical downlink control channel, a reference signal associated with a physical uplink channel, a reference signal associated with a physical downlink channel, a synchronization signal, a channel state information reference signal, or a positioning reference signal.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: determining a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device; and communicating with a non-terrestrial wireless communication device based at least in part on the synchronization accuracy level.

Aspect 2: The method of Aspect 1, wherein determining the synchronization accuracy level comprises determining the synchronization accuracy level based at least in part on at least one of a global navigation satellite system positioning accuracy or a serving satellite ephemeris.

Aspect 3: The method of either of Aspects 1 or 2, wherein communicating with the non-terrestrial wireless communication device based at least in part on the synchronization accuracy level comprises at least one of: disabling a global navigation satellite system (GNSS) positioning process; disabling a satellite ephemeris determination process; lowering a GNSS positioning procedure accuracy level, or lowering a satellite ephemeris determination procedure accuracy level.

Aspect 4: The method of any of Aspects 1-3, wherein determining the synchronization accuracy level comprises determining the synchronization accuracy level based at least in part on at least one of: referencing a wireless communication standard, or receiving, from a serving non-terrestrial wireless device, an indication that indicates the synchronization accuracy level, wherein determining the synchronization accuracy level comprises determining the synchronization accuracy level based at least in part on the indication.

Aspect 5: The method of Aspect 4, wherein receiving the indication comprises receiving at least one of: a system information broadcast message, a downlink radio resource control (RRC) message, a downlink medium access control control element (MAC CE), or a downlink control information (DCI) transmission.

Aspect 6: The method of Aspect 5, further comprising transmitting a request for a lowered synchronization accuracy level, wherein receiving the indication comprises receiving the indication based at least in part on transmitting the request.

Aspect 7: The method of Aspect 6, wherein transmitting the request comprises transmitting at least one of: an uplink RRC message, an uplink MAC CE, or an uplink control information transmission.

Aspect 8: The method of either of Aspects 6 or 7, wherein the request indicates a suggested synchronization accuracy level.

Aspect 9: The method of any of Aspects 1-8, further comprising determining at least one of a reduced capacity numerology or a reduced capacity resource allocation associated with at least one of: a physical uplink shared channel, a physical uplink control channel, a random access channel preamble transmission, a physical downlink shared channel, a physical downlink control channel, a reference signal associated with a physical uplink channel, a reference signal associated with a physical downlink channel, a synchronization signal, a channel state information reference signal, or a positioning reference signal.

Aspect 10: The method of Aspect 9, wherein the reduced capacity numerology comprises at least one of: a subcarrier spacing that is greater than a subcarrier spacing associated with an enhanced mobile broadband (eMBB) device, a cyclic prefix that is longer than a cyclic prefix associated with the eMBB device, or a symbol duration that is longer than a symbol duration associated with the eMBB device.

Aspect 11: The method of either of Aspects 9 or 10, wherein determining the reduced capacity resource allocation comprises receiving an indication of the reduced capacity resource allocation, wherein the indication of the reduced capacity resource allocation indicates a number of available tones for transmission that is less than a number of available tones for transmission associated with an eMBB device.

Aspect 12: The method of Aspect 11, wherein the number of available tones corresponds to a first subset of resource elements (REs) of a set of REs within a scheduled resource, wherein the set of REs comprises the first subset of REs and a second subset of REs, and wherein the second subset of REs are to be unused by the UE.

Aspect 13: The method of any of Aspects 9-12, wherein determining the at least one of the reduced capacity numerology or the reduced capacity resource allocation comprises determining the at least one of the reduced capacity numerology or the reduced capacity resource allocation based at least in part on a dedicated bandwidth part.

Aspect 14: The method of any of Aspects 9-13, wherein determining the at least one of the reduced capacity numerology or the reduced capacity resource allocation comprises determining the at least one of the reduced capacity numerology or the reduced capacity resource allocation based at least in part on at least one of: referencing a wireless communication standard, or receiving, from a serving non-terrestrial wireless device, an indication that indicates the synchronization accuracy level, wherein determining the synchronization accuracy level comprises determining the synchronization accuracy level based at least in part on the indication.

Aspect 15: A method of wireless communication performed by a non-terrestrial wireless communication device, comprising: determining a synchronization accuracy level, associated with a reduced capacity user equipment (UE), that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device; and communicating with the reduced capacity UE via a non-terrestrial wireless network based at least in part on the synchronization accuracy level.

Aspect 16: The method of Aspect 15, wherein determining the synchronization accuracy level comprises determining the synchronization accuracy level based at least in part on at least one of a global navigation satellite system positioning accuracy or a serving satellite ephemeris.

Aspect 17: The method of either of Aspects 15 or 16, wherein communicating with the UE based at least in part on the synchronization accuracy level comprises communicating with the UE based at least in part on at least one of: a disabled global navigation satellite system (GNSS) positioning process; a disabled satellite ephemeris determination process; a lowered GNSS positioning procedure accuracy level, or a lowered satellite ephemeris determination procedure accuracy level.

Aspect 18: The method of any of Aspects 15-17, wherein determining the synchronization accuracy level comprises determining the synchronization accuracy level based at least in part on at least one of: referencing a wireless communication standard, or transmitting, to the UE, an indication that indicates the synchronization accuracy level, wherein determining the synchronization accuracy level comprises determining the synchronization accuracy level based at least in part on the indication.

Aspect 19: The method of Aspect 18, wherein transmitting the indication comprises transmitting at least one of: a system information broadcast message, a downlink radio resource control (RRC) message, a downlink medium access control control element (MAC CE), or a downlink control information (DCI) transmission.

Aspect 20: The method of Aspect 19, further comprising receiving a request for a lowered synchronization accuracy level, wherein transmitting the indication comprises transmitting the indication based at least in part on receiving the request.

Aspect 21: The method of Aspect 20, wherein receiving the request comprises receiving at least one of: an uplink RRC message, an uplink MAC CE, or an uplink control information transmission.

Aspect 22: The method of either of Aspects 20 or 21, wherein the request indicates a suggested synchronization accuracy level.

Aspect 23: The method of any of Aspects 15-22, further comprising determining at least one of a reduced capacity numerology or a reduced capacity resource allocation associated with at least one of: a physical uplink shared channel, a physical uplink control channel, a random access channel preamble transmission, a physical downlink shared channel, a physical downlink control channel, a reference signal associated with a physical uplink channel, a reference signal associated with a physical downlink channel, a synchronization signal, a channel state information reference signal, or a positioning reference signal.

Aspect 24: The method of Aspect 23, wherein the reduced capacity numerology comprises at least one of: a subcarrier spacing that is greater than a subcarrier spacing associated with an enhanced mobile broadband (eMBB) device, a cyclic prefix that is longer than a cyclic prefix associated with the eMBB device, or a symbol duration that is longer than a symbol duration associated with the eMBB device.

Aspect 25: The method of either of Aspects 23 or 24, wherein determining the reduced capacity resource allocation comprises transmitting an indication of the reduced capacity resource allocation, wherein the indication of the reduced capacity resource allocation indicates a number of available tones for transmission that is less than a number of available tones for transmission associated with an eMBB device.

Aspect 26: The method of Aspect 25, wherein the number of available tones corresponds to a first subset of resource elements (REs) of a set of REs within a scheduled resource, wherein the set of REs comprises the first subset of REs and a second subset of REs, and wherein the second subset of REs are to be unused by the reduced capacity UE.

Aspect 27: The method of any of Aspects 23-26, wherein determining the at least one of the reduced capacity numerology or the reduced capacity resource allocation comprises determining the at least one of the reduced capacity numerology or the reduced capacity resource allocation based at least in part on a dedicated bandwidth part.

Aspect 28: The method of any of Aspects 23-27, wherein determining the at least one of the reduced capacity numerology or the reduced capacity resource allocation comprises determining the at least one of the reduced capacity numerology or the reduced capacity resource allocation based at least in part on at least one of: referencing a wireless communication standard, or transmitting, to the UE, an indication that indicates the synchronization accuracy level, wherein determining the synchronization accuracy level comprises determining the synchronization accuracy based at least in part on the indication.

Aspect 29: An apparatus for wireless communication at a device, comprising a processor; memory coupled with the processor; and instructions stored in the memory and executable by the processor to cause the apparatus to perform the method of one or more Aspects of Aspects 1-14.

Aspect 30: A device for wireless communication, comprising a memory and one or more processors coupled to the memory, the memory and the one or more processors configured to perform the method of one or more Aspects of Aspects 1-14.

Aspect 31: An apparatus for wireless communication, comprising at least one means for performing the method of one or more Aspects of Aspects 1-14.

Aspect 32: A non-transitory computer-readable medium storing code for wireless communication, the code comprising instructions executable by a processor to perform the method of one or more Aspects of Aspects 1-14.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 34: An apparatus for wireless communication at a device, comprising a processor; memory coupled with the processor; and instructions stored in the memory and executable by the processor to cause the apparatus to perform the method of one or more Aspects of Aspects 15-28.

Aspect 35: A device for wireless communication, comprising a memory and one or more processors coupled to the memory, the memory and the one or more processors configured to perform the method of one or more Aspects of Aspects 15-28.

Aspect 36: An apparatus for wireless communication, comprising at least one means for performing the method of one or more Aspects of Aspects 15-28.

Aspect 37: A non-transitory computer-readable medium storing code for wireless communication, the code comprising instructions executable by a processor to perform the method of one or more Aspects of Aspects 15-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 15-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      determine a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device;
      communicate with a non-terrestrial wireless communication device based at least in part on the synchronization accuracy level; and
   wherein the one or more processors, to determine the synchronization accuracy level, are configured to determine the synchronization accuracy level based at least in part on at least one of:
   referencing a wireless communication standard, or
   receiving, from a serving non-terrestrial wireless device, an indication that indicates the synchronization accuracy level, wherein determining the synchronization accuracy level comprises determining the synchronization accuracy level based at least in part on the indication.

2. The UE of claim 1, wherein the one or more processors, to determine the synchronization accuracy level, are configured to determine the synchronization accuracy level based at least in part on at least one of a global navigation satellite system positioning accuracy or a serving satellite ephemeris.

3. The UE of claim 1, wherein the one or more processors, to communicate with the non-terrestrial wireless communication device based at least in part on the synchronization accuracy level, are configured to:
   disable a global navigation satellite system (GNSS) positioning process;
   disable a satellite ephemeris determination process;
   lower a GNSS positioning procedure accuracy level; or lower a satellite ephemeris determination procedure accuracy level.

4. The UE of claim 1, wherein the one or more processors, to receive the indication, are configured to receive at least one of:
   a system information broadcast message,
   a downlink radio resource control (RRC) message,
   a downlink medium access control control element (MAC CE), or
   a downlink control information (DCI) transmission.

5. The UE of claim 4, wherein the one or more processors are further configured to transmit a request for a lowered synchronization accuracy level, wherein the one or more processors, to receive the indication, are configured to receive the indication based at least in part on transmitting the request.

6. The UE of claim 5, wherein the one or more processors, to transmit the request, are configured to transmit at least one of:
   an uplink RRC message,
   an uplink MAC CE, or
   an uplink control information transmission.

7. The UE of claim 5, wherein the request indicates a suggested synchronization accuracy level.

8. The UE of claim 1, wherein the one or more processors are further configured to determine at least one of a reduced capacity numerology or a reduced capacity resource allocation associated with at least one of:
   a physical uplink shared channel,
   a physical uplink control channel,
   a random access channel preamble transmission,
   a physical downlink shared channel,
   a physical downlink control channel,
   a reference signal associated with a physical uplink channel,
   a reference signal associated with a physical downlink channel,
   a synchronization signal,
   a channel state information reference signal, or
   a positioning reference signal.

9. The UE of claim 8, wherein the reduced capacity numerology comprises at least one of:
   a subcarrier spacing that is greater than a subcarrier spacing associated with an enhanced mobile broadband (eMBB) device,
   a cyclic prefix that is longer than a cyclic prefix associated with the eMBB device, or
   a symbol duration that is longer than a symbol duration associated with the eMBB device.

10. The UE of claim 8, wherein the one or more processors, to determine the reduced capacity resource allocation, are configured to receive an indication of the reduced capacity resource allocation, wherein the indication of the reduced capacity resource allocation indicates a number of available tones for transmission that is less than a number of available tones for transmission associated with an eMBB device.

11. The UE of claim 10, wherein the number of available tones corresponds to a first subset of resource elements (REs) of a set of REs within a scheduled resource, wherein the set of REs comprises the first subset of REs and a second subset of REs, and wherein the second subset of REs are to be unused by the UE.

12. The UE of claim 8, wherein the one or more processors, to determine the at least one of the reduced capacity numerology or the reduced capacity resource allocation, are configured to determine the at least one of the reduced capacity numerology or the reduced capacity resource allocation based at least in part on a dedicated bandwidth part.

13. The UE of claim 8, wherein the one or more processors, to determine the at least one of the reduced capacity numerology or the reduced capacity resource allocation, are configured to determine the at least one of the reduced capacity numerology or the reduced capacity resource allocation based at least in part on:

referencing a wireless communication standard, or receiving, from a serving non-terrestrial wireless device, an indication that indicates the synchronization accuracy level, wherein determining the synchronization accuracy level comprises determining the synchronization accuracy level based at least in part on the indication.

14. A non-terrestrial wireless communication device for wireless communication, comprising:

a memory; and one or more processors, coupled to the memory, configured to:

determine a synchronization accuracy level, associated with a reduced capacity user equipment (UE), that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device;

communicate with the reduced capacity UE via a non-terrestrial wireless network based at least in part on the synchronization accuracy level; and wherein the one or more processors, to determine the synchronization accuracy level, are configured to determine the synchronization accuracy level based at least in part on at least one of:

referencing a wireless communication standard, or transmitting, to the UE, an indication that indicates the synchronization accuracy level, wherein determining the synchronization accuracy level comprises determining the synchronization accuracy level based at least in part on the indication.

15. The non-terrestrial wireless communication device of claim 14, wherein the one or more processors, to determine the synchronization accuracy level, are configured to determine the synchronization accuracy level based at least in part on at least one of a global navigation satellite system positioning accuracy or a serving satellite ephemeris.

16. The non-terrestrial wireless communication device of claim 14, wherein the one or more processors, to communicate with the UE based at least in part on the synchronization accuracy level, are configured to communicate with the UE based at least in part on at least one of:

a disabled global navigation satellite system (GNSS) positioning process;

a disabled satellite ephemeris determination process;

a lowered GNSS positioning procedure accuracy level; or a lowered satellite ephemeris determination procedure accuracy level.

17. The non-terrestrial wireless communication device of claim 14, wherein the one or more processors, to transmit the indication, are configured to transmit at least one of:

a system information broadcast message, a downlink radio resource control (RRC) message, a downlink medium access control control element (MAC CE), or a downlink control information (DCI) transmission.

18. The non-terrestrial wireless communication device of claim 17, wherein the one or more processors are further configured to receive a request for a lowered synchronization accuracy level, wherein the one or more processors, to transmit the indication, are configured to transmit the indication based at least in part on receiving the request.

19. The non-terrestrial wireless communication device of claim 18, wherein the one or more processors, to receive the request, are configured to receive at least one of:

an uplink RRC message, an uplink MAC CE, or an uplink control information transmission.

20. The non-terrestrial wireless communication device of claim 18, wherein the request indicates a suggested synchronization accuracy level.

21. The non-terrestrial wireless communication device of claim 14, wherein the one or more processors are further configured to determine at least one of a reduced capacity numerology or a reduced capacity resource allocation associated with at least one of:

a physical uplink shared channel, a physical uplink control channel, a random access channel preamble transmission, a physical downlink shared channel, a physical downlink control channel, a reference signal associated with a physical uplink channel, a reference signal associated with a physical downlink channel, a synchronization signal, a channel state information reference signal, or a positioning reference signal.

22. The non-terrestrial wireless communication device of claim 21, wherein the reduced capacity numerology comprises at least one of:

a subcarrier spacing that is greater than a subcarrier spacing associated with an enhanced mobile broadband (eMBB) device, a cyclic prefix that is longer than a cyclic prefix associated with the eMBB device, or a symbol duration that is longer than a symbol duration associated with the eMBB device.

23. The non-terrestrial wireless communication device of claim 21, wherein the one or more processors, to determine the reduced capacity resource allocation, are configured to transmit an indication of the reduced capacity resource allocation, wherein the indication of the reduced capacity resource allocation indicates a number of available tones for transmission that is less than a number of available tones for transmission associated with an eMBB device.

24. The non-terrestrial wireless communication device of claim 23, wherein the number of available tones corresponds to a first subset of resource elements (REs) of a set of REs within a scheduled resource, wherein the set of REs comprises the first subset of REs and a second subset of REs, and wherein the second subset of REs are to be unused by the reduced capacity UE.

25. The non-terrestrial wireless communication device of claim 21, wherein the one or more processors, to determine the at least one of the reduced capacity numerology or the reduced capacity resource allocation, are configured to determine the at least one of the reduced capacity numerology or the reduced capacity resource allocation based at least in part on a dedicated bandwidth part.

26. The non-terrestrial wireless communication device of claim 21, wherein the one or more processors, to determine the at least one of the reduced capacity numerology or the reduced capacity resource allocation, are configured to determine the at least one of the reduced capacity numerology or the reduced capacity resource allocation based at least in part on at least one of:

referencing a wireless communication standard, or transmitting, to the UE, an indication that indicates the synchronization accuracy level, wherein determining the synchronization accuracy level comprises determining the synchronization accuracy based at least in part on the indication.

27. A method of wireless communication performed by a user equipment (UE), comprising:

determining a synchronization accuracy level that satisfies a reduced capacity synchronization accuracy threshold, the synchronization accuracy level corresponding to at least one of uplink communications or downlink communications, wherein the UE comprises a reduced capacity UE and wherein the reduced capacity synchronization accuracy threshold is lower than a synchronization accuracy threshold of an enhanced mobile broadband device;

communicating with a non-terrestrial wireless communication device based at least in part on the synchronization accuracy level; and wherein the determining the synchronization accuracy level is based at least in part on at least one of:

referencing a wireless communication standard, or receiving, from a serving non-terrestrial wireless device, an indication that indicates the synchronization accuracy level, wherein determining the synchronization accuracy level comprises determining the synchronization accuracy level based at least in part on the indication.

28. A method of wireless communication performed by a non-terrestrial wireless communication device, comprising:

determining a synchronization accuracy level, associated with a reduced capacity user equipment (UE), that satisfies a reduced capacity synchronization accuracy threshold, the synchronization accuracy level corresponding to at least one of uplink communications or downlink communications, wherein the reduced capacity synchronization accuracy threshold is lower than a synchronization accuracy threshold of an enhanced mobile broadband device;

communicating with the reduced capacity UE via a non-terrestrial wireless network based at least in part on the synchronization accuracy level; and wherein the determining the synchronization accuracy level is based at least in part on at least one of:

referencing a wireless communication standard, or transmitting, to the UE, an indication that indicates the synchronization accuracy level, wherein determining the synchronization accuracy level comprises determining the synchronization accuracy level based at least in part on the indication, wherein the determining the synchronization accuracy level, are configured to determine the synchronization accuracy level based at least in part on at least one of:

referencing a wireless communication standard, or transmitting, to the UE, an indication that indicates the synchronization accuracy level, wherein determining the synchronization accuracy level comprises determining the synchronization accuracy level based at least in part on the indication.

* * * * *